(12) United States Patent
Barnard

(10) Patent No.: US 8,359,256 B1
(45) Date of Patent: Jan. 22, 2013

(54) SHORT SALE INFORMATION

(75) Inventor: Chas G. Barnard, Dallas, TX (US)

(73) Assignee: Chas G. Barnard, Dallas, TX (US)

( * ) Notice: Subject to any disclaimer, the term of this patent is extended or adjusted under 35 U.S.C. 154(b) by 261 days.

(21) Appl. No.: 12/722,098

(22) Filed: Mar. 11, 2010

(51) Int. Cl.
*G06Q 40/00* (2012.01)
(52) U.S. Cl. .................................. 705/36 R; 705/35
(58) Field of Classification Search .............. 705/35–40
See application file for complete search history.

(56) References Cited

U.S. PATENT DOCUMENTS

| | | | |
|---|---|---|---|
| 6,112,189 A * | 8/2000 | Rickard et al. .............. | 705/36 R |
| 2004/0054614 A1 * | 3/2004 | Tell et al. ........................ | 705/37 |

* cited by examiner

*Primary Examiner* — Rajesh Khattar
(74) *Attorney, Agent, or Firm* — Booth Albanesi Schroeder LLC

(57) ABSTRACT

A system, method, and computer program product are provided for short sale information. Short sale information, including short interest in a security, from at least one source is stored in a database. Short sale volumes of shares are calculated for the security by summing a volume of shares associated with each short sale for each time unit during a time period. A graph is generated by plotting each short sale volume of shares associated with a time unit on a horizontal axis, plotting volume of shares on one vertical axis, and plotting a closing price for the security for each time unit on another vertical axis. A report that includes the graph is output via a user interface to an investor, prompting the investor to purchase security shares based on the graph depicting an increase in the short sale volume of shares and a corresponding decrease in the closing price.

4 Claims, 14 Drawing Sheets

500 ↓

1100
↓

| After | 1 Mo | 3 Mos | 6 Mos | 12 Mos | 24 Mos |
|---|---|---|---|---|---|
| Price %D | -8% | -1% | 5% | 11% | 17% |
| Short/Float | 22% | 20% | 18% | 14% | 12% |
| Cover Days | 17 | 15 | 13 | 11 | 8 |
| Model: | | | | | |
| Short Target | $20.24 | $21.78 | $23.10 | $24.42 | $25.74 |
| Short Interest Target | 2.2M | 2M | 1.8M | 1.4M | 1.2M |

| Security | Short Interest %D | ShortBlock %D | Short Target %D |
|---|---|---|---|
| XYZ | 21% | 8% | 20% |
| ABC | 20% | 9% | 15% |
| DEF | 19% | 10% | 10% |
| GHI | 18% | 11% | 5% |
| JKL | 17% | 12% | 0% |
| MNO | 16% | 13% | -5% |

| Symbol | Short/Float | %Short Change | %Price Change | Absolute | Industry |
|---|---|---|---|---|---|
| US | 10% | -90% | 1184% | 12.7 | Info Tech |
| ROIA | 5% | -30% | 61% | 0.9 | |
| FSYS | 17% | -26% | 36% | 0.6 | Auto Parts |
| BOK | 4% | -34% | 24% | 0.6 | Small Tool |
| CSIQ | 8% | -19% | 37% | 0.6 | Semiconduct |

| Symbol | Short/Float | %Short Change | %Price Change | Absolute | Industry |
|---|---|---|---|---|---|
| RPFG | 7% | 19760% | -41% | 198.0 | PacBank |
| IRDM | 8% | 1283% | -12% | 13.0 | DivInvest |
| FTWR | 3% | 1058% | -61% | 11.2 | WirelessCom |
| APT | 3% | 618% | -27% | 6.5 | MedAppliance |
| CHNG | 5% | 270% | -25% | 3.0 | GasUtilities |

| Symbol | Short/Float | %Short Change | %Price Change | Absolute | Industry |
|---|---|---|---|---|---|
| AGEN | 9% | -57% | -40% | 0.97 | Biotech |
| ATLS | 6% | -57% | -13% | 0.70 | Oil&Gas |
| PVTB | 10% | -19% | -47% | 0.66 | MWBanks |
| CKEC | 4% | -25% | -39% | 0.64 | MovieProd |
| SMSI | 3% | -29% | -31% | 0.60 | AppSoftware |

| Symbol | Short/Float | %Short Change | %Price Change | Absolute | Industry |
|---|---|---|---|---|---|
| CPIX | 9% | 151% | 16% | 1.68 | DrugMfg |
| INO | 4% | 133% | 22% | 1.55 | Biotech |
| NANO | 4% | 75% | 57% | 1.32 | ScieTech |
| CML | 9% | 101% | 19% | 1.20 | DataStore |
| RDY | 3% | 95% | 18% | 1.13 | DrugMfg |

SHORT SALE INFORMATION

CROSS REFERENCE TO RELATED APPLICATIONS

Not applicable

STATEMENT REGARDING FEDERALLY SPONSORED RESEARCH OR DEVELOPMENT

Not applicable

REFERENCE TO MICROFICHE APPENDIX

Not applicable

FIELD OF THE PRESENT DISCLOSURE

The embodiments of the present disclosure relate generally to aggregating, analyzing, and distributing short-sale trading information, and more specifically to a system, computer program product, and method for outputting reports that include short sale information calculations and short sale information graphs that prompt investors to buy and sell securities.

BACKGROUND

To profit from a decrease in the price of a security, a short seller can borrow the security and sell it, expecting that it will be cheaper to repurchase in the future. When the short seller decides that the time is right, or when the lender recalls the securities, the short seller buys equivalent securities and returns them to the lender. The process relies on the fact that the securities are fungible; the term "borrowing" is used in the sense of borrowing $10, where a different $10 note can be returned to the lender, rather than in the sense of borrowing a car, where the same car needs to be returned.

A short seller typically borrows through a broker, who is usually holding the securities for another investor who owns the securities; the broker itself seldom purchases the securities to lend to the short seller. The lender does not lose the right to sell the securities while they have been lent, as the broker will usually hold a large pool of such securities for a number of investors which, as such securities are fungible, can instead be transferred to any buyer. In most market conditions there is a ready supply of securities to be borrowed, held by pension funds, mutual funds and other investors.

The act of buying back the securities that were sold short is called "covering the short" or "covering the position". A short position can be covered at any time before the securities are due to be returned. Once the position is covered, the short seller will not be affected by any subsequent rises or falls in the price of the securities, as the short seller already holds the securities required to repay the lender.

For example, if shares in XYZ Company currently trade at $10 per share, a short seller can borrow 100 shares of XYZ Company and immediately sell those shares for a total of $1,000. If the price of the shares falls to $8 per share, the short seller can buy 100 shares back for $800, return the shares to lender and keep the $200 profit, minus borrowing fees. The lender accepts the return of the same number of shares as it originally lent, despite the fact that the market value of the shares has decreased. However, if the price of the shares in XYZ Company instead rises to $25 per share following the short sale, and the short seller is required to return the shares, the short seller would have to buy back 100 shares at $2,500 and would make a loss of $1,500, plus borrowing fees.

Short selling is the opposite of "going long". A short seller takes a negative, or "bearish" stance, believing that the price of a security will fall. Investors who employ short selling often use it to allow them to profit on trading in securities which they believe are overvalued, just as traditional long investors attempt to profit on securities which are undervalued by buying them.

Because a short position is the opposite of a long position, many features of the position are reversed in comparison. In particular, the profit, rather than the loss, is limited to the value of the security, but the loss, rather than the profit, is unlimited. In practice, as the price of a security rises the short seller will receive a margin call from the broker, demanding that the short seller either cover his short position, by purchasing the security, or provide additional cash in order to meet the margin requirement for the security, which effectively places a limit on the amount that can be lost.

It is generally advantageous for investors to know as much short sale information about a particular security. For example, a stock having a large short interest, the total number of shares sold short, outstanding may indicate that the stock will experience a negative return. In some cases, however, a large short-interest may be a "bullish" signal because it represents a latent demand for the stock that will eventually result in actual purchases of the stock by investors covering their short positions. Thus, an investor will be better equipped to make an investment decision with respect to a particular stock if the investor knows the short sale information about the stock.

Stock exchanges and/or government regulatory agencies may publish short sale information on a daily basis. The Hong Kong Stock Exchange publishes on a daily basis the number of shares shorted for a particular stock, the value of the total number of shorted shares and the percent of short sales relative to the total turnover for the particular stock. The Australian Stock Exchange publishes short-sale information in real-time for stocks traded on the exchange. A stock exchange or a government regulatory agency may publish short sale information through the release of dozens of text files that each includes millions of records about short sales.

However, such short sale information is still of limited value to short-selling investors. First, processing million of records on a daily basis may be beyond the capacity of many investors. Furthermore, this published short sale information does not easily help the investor identify either trends in the market or under-valued securities. Given the above, investors and traders are at a significant disadvantage due to the lack of analyzed short sale information. Accordingly, it is desirable to provide a system and method for aggregating, analyzing, and distributing short sale information.

SUMMARY

A system, computer program product, and method are provided for short sale information. A computer executes a computer program in a memory to store short sale information received from at least one trade information source in a database. The computer program analyzes the short sale information to generate reports that may include both calculations based on the short sale information and graphs based on the short sale information. The computer program provides the reports to an investor as an aid in the investor's investment research and decision-making process. The reports may include information based on specific insights, such as purchasing shares of a security: when the security's short volume increases significantly on days when the security's price decreases, when short sellers have not made large monetary bets against the security and when the short selling activity that did occur was at a reasonable valuation relative to its peers, when the majority of the short volume for a period is below the current price of the security, when an unusually large amount of short selling activity occurs in a security compared to similar securities, at the bid price when a large amount of short sales occur at the bid price, and at the bid price when a large amount of short sales occur at the bid price for a certain share price. Embodiments of the present disclosure enable investors to identify trends in the market and under-valued securities.

BRIEF DESCRIPTION OF THE DRAWINGS

Drawings of the preferred embodiments of the present disclosure are attached hereto so that the embodiments of the present disclosure may be better and more fully understood:

FIG. 14 presents a sample frame of a display screen presented by the user interface of the present disclosure;

FIG. 15 presents a sample frame of another display screen presented by the user interface of the present disclosure;

FIG. 16 presents a sample frame of yet another display screen presented by the user interface of the present disclosure;

FIG. 17 presents a sample frame of a display screen presented by the user interface of the present disclosure.

DETAILED DESCRIPTION OF SOME EMBODIMENTS

Figure 1:
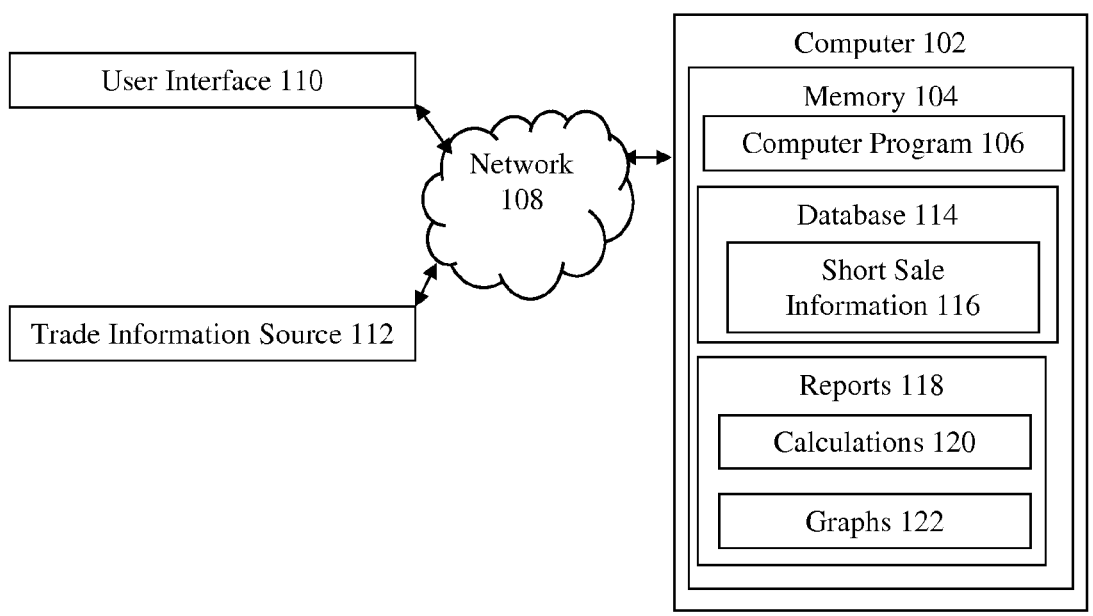
FIG. 1 presents a sample system of the present disclosure.

FIG. 1 presents a sample system 100 of the present disclosure. The system 100 includes a computer 102, a memory 104, a computer program 106, a network 108, a user interface 110, and a trade information source 112. The computer program 106 is stored in the memory 104 and executed by the computer 102 to communicate with the user interface 110 and the trade information source 112 via the network 108. Although FIG. 1 depicts that the memory 104 may also include a database 114 that includes short sale information 116 and reports 118 that include calculations 120 and graphs 122, the elements 114-122 may reside in a separate data storage (not depicted in FIG. 1) or any combination of the elements 112-122 may reside in any combination of the memory 104 and the separate data storage. Although FIG. 1 depicts one of each of the elements 102-122, the system 100 may include any number of each of the elements 102-122.

The computer 102 may execute the computer program 106 to store the short sale information 116 received from the trade information source 112 via the network 108 in the database 114. The computer program 106 may analyze the short sale information 116 to generate the reports 118 that may include both the calculations 120 based on the short sale information 116 and graphs 122 based on the short sale information 116. The computer program 106 may provide the reports 118 to an investor operating the user interface 110 via the network 108 on a periodic basis, such as daily, and/or on an occasional basis, such as in response to a request for updated reports 118 from the user interface 110. As will be described below in greater detail, the reports 118 may include frames that may be presented in various formats and in varying levels of detail. The system 100 may be operated by a financial institution (e.g., a brokerage firm or exchange) desiring to aggregate and analyze the short sale information 116 from the trade information source 112 and provide the analyzed information to investors as an aid in their investment research and decision-making process.

The trade information source 112 may include any source of trade information for any security. For example, the trade information source 112 may include trading information generated by a financial institution that executes short-sales for its clients as well on its own behalf. This information typically includes the transaction details for each short sale performed by the financial institution, such as cusip, symbol, sector, share amount and price.

The short sale information 116 may include any information relating to short sales of any type of security or traded instrument. For example, the short sale information 116 may include the amount of short interest in a particular security; the change from a previous period in the amount of short interest in a particular security; the number of short sale requests received for a particular security; the number of settled short sale requests for a particular security; a rate indicator for a security that indicates whether the cost for borrowing a particular security to facilitate a short-sale is increasing or decreasing; recall trend information that indicates whether a lender of a particular security has recalled an outstanding loan; and availability information that indicates whether a particular security is available for loan. The short sale information 116 may be aggregated and analyzed for various security types and transactions including, by way of non-limiting example, equities, exchange traded funds, convertible arbitrage, risk arbitrage, American Depository Receipts (ADRs) and any other security type.

Figure 2:
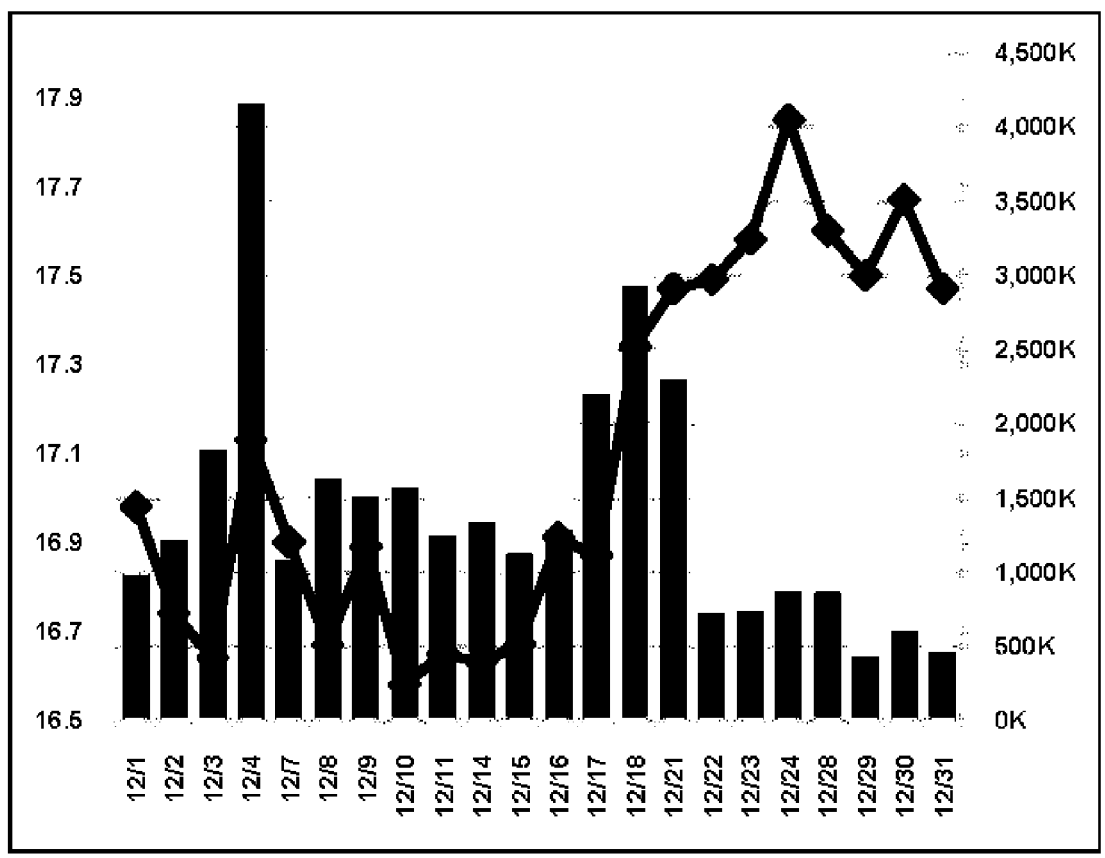
FIG. 2 presents a sample frame of a display screen presented by the user interface of the present disclosure.

FIG. 2 presents a sample frame 200 of a display screen presented by the user interface 110 of the present disclosure. The frame 200 includes a graph that depicts a daily short volume for a selected security with a closing price overlaid. A security may be selected by the computer program 106 based on specific characteristics, such as a particular price to earnings ratio, or selected by an investor via the user interface 110, such as a specific security that the investor is evaluating. The computer program 106 calculates the short sale volumes of a security's shares by adding up the volume of the security's shares for each short sale for each time unit during a time period. For example, the computer program 106 calculates that more than 4,000,000 shares of the security were sold short on December 4 and that less than 500,000 shares of the security were sold short on December 29. The computer program 106 generates a graph by plotting each of the security's short sale volumes of shares for each time unit on a horizontal axis and plotting volume of shares on a vertical axis. For example, the frame 200 depicts that more than 4,000,000 shares of the security were sold short on December 4 and that less than 500,000 shares of the security were sold short on December 29. The computer program 106 also plots a closing price for the security for each time unit on another vertical axis. For example, the frame 200 depicts a closing price of approximately $17.00 per share on December 1 and a closing price of approximately $17.50 per share on December 31.

The computer program 106 outputs a report that includes a graph, such as the frame 200, via the user interface 110 to an investor. The information in frame 200 may be helpful for investors because it shows the correlation between short volume and the price of the security. If the short volume increases significantly on days when the price decreases, the investor may infer that a large part of the decline in the price was due to short sellers pushing the security down and purchase shares. For example, an investor may purchase shares on December 2 because the frame 200 depicts that the short volume increased from the short volume on December 1 and the price decreased from the price on December 1. Inversely, the investor may infer that short sellers are skeptical of a security's valuation if short volume increases significantly on a day when price increases significantly and sell shares. For example, the investor may sell shares on December 4 because the frame 200 depicts that the short volume increased from the short volume on December 3 and the price increased from the price on December 1.

Figure 3:
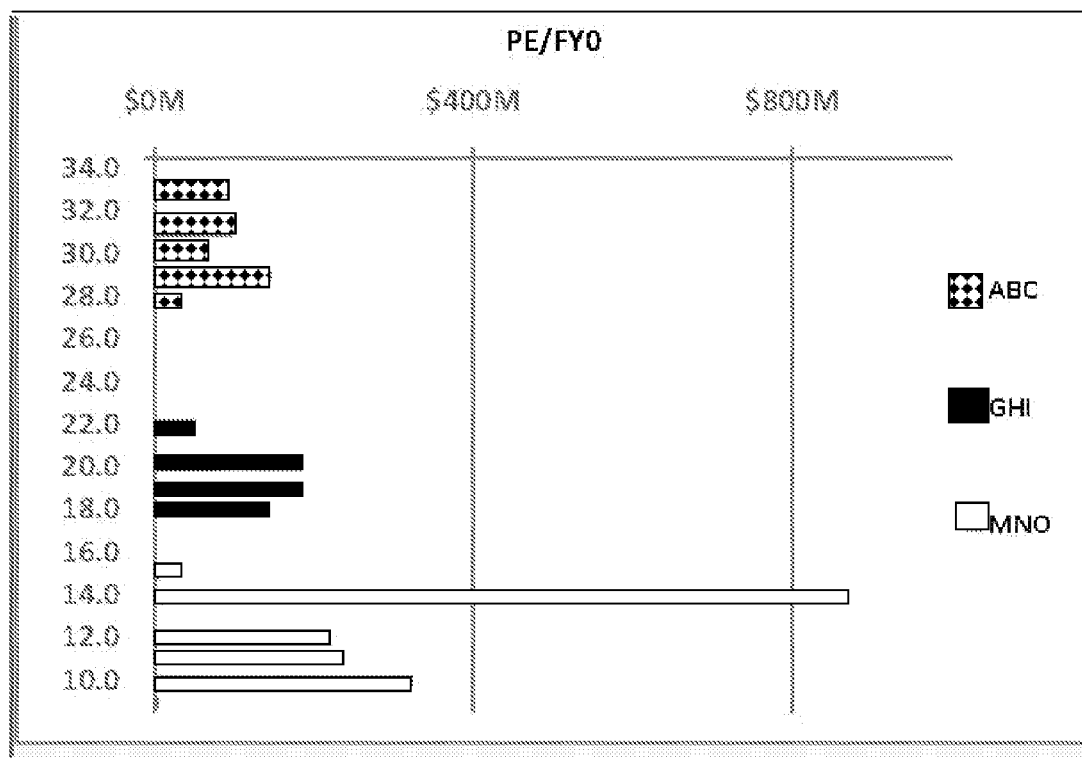
FIG. 3 presents a sample frame of another display screen presented by the user interface of the present disclosure.

FIG. 3 presents another sample frame 300 of another display screen presented by the user interface 110 of the present disclosure. The frame 300 includes a graph that depicts short volume peer analysis based on price valuation. The computer program 106 assigns a price valuation range to each transaction for each selected security. Securities may be selected by the computer program 106 based on common characteristics, such as securities within the same industry, or selected by an investor via the user interface 110, such as specific securities that the investor is evaluating. For example, the computer program 106 assigns a price to earnings ratio of 30.0 for the current fiscal year to a specific trade for shares of the security ABC. The computer program 106 calculates a short value exposure for each short sale for each selected security by multiplying the volume of shares associated with a short sale of a security by the price associated with the short sale. For example, the computer program 106 multiplies the 1,000 shares of a specific trade for the security ABC by the price of 25 dollars per share for the security ABC to result in a value of $25,000 for that trade of the security ABC. The computer program 106 calculates a summed short value exposure for each specified security by summing each short value exposure at each corresponding price valuation range for each corresponding transaction. For example, the computer program 106 adds the 25,000 dollars of short value exposure that corresponds to a trade for the security ABC that was assigned the price to earnings ratio of 30.0 to 40,000 dollars of short value exposure that corresponds to another trade for the security ABC that was assigned the price to earnings ratio of 30.0 to result in a summed short value exposure of 65,000 dollars for the security ABC that was assigned the price to earnings ratio of 30.0. The computer program 106 generates a graph by plotting each summed short value exposure corresponding to a time period on a vertical axis, and plotting volume of shares corresponding to each summed short value exposure on a horizontal axis. For example, the computer program 106 plots the 65,000 dollars for the security ABC that was assigned the price to earnings ratio of 30.0 on the graph depicted by the frame 300.

The computer program 106 outputs a report that comprises the graph via the user interface 110 to an investor. The investor may be considering the purchase of a security and want to know whether short sellers believe that the security is overvalued relative to its peers. For example, the investor is considering purchasing security GHI, which is represented by the black bars depicted between the price to earnings ratios of 18.0 to 22.0. The investor may infer that short sellers have not made large monetary bets against the security GHI relative to the average monetary bets made against securities ABC and MNO. The investor may also infer that the short selling activity that did occur was at a reasonable valuation relative to its peers, which occurred at price to earning ratios from 28.0 to 34.0 for security ABC and price to earning ratios from 10.0 to 16.0 for security MNO. Therefore, the investor may not have much cause for concern and may purchase shares in the security GHI. In another example, the investor is considering purchasing security MNO, which is represented by the white bars depicted between the price to earnings ratios of 10.0 to 16.0. The investor may infer that there is an abnormally large monetary bet being placed against security MNO compared to the monetary bet being placed against securities ABC and GHI. The investor may also infer that the bet is being made at a low valuation relative to its peers, which occurred at price to earning ratios from 28.0 to 34.0 for security ABC and price to earning ratios 18.0 to 22.0 for security GHI. The investor may infer that short sellers think that MNO stock is expensive at a relatively cheap valuation and have made an abnormally large bet against it. The investor may respond by selling short the security MNO, or avoid purchasing the security MNO if the investor was considering such a purchase.

Although the graph in frame 300 depicts the price to earnings ratio for the current fiscal year as the price valuation used to evaluate the selected securities ABC, GHI, and MNO, the price valuation may also be based on a price to earnings ratio for a trailing twelve month period, a price to earnings ratio for a next fiscal year period, or a price to book ratio for a most recent quarter period. Additionally, the graph of the securities depicted in the frame 300 may depict industry groups of securities instead of individual securities. For example, ABC, GHI, and MNO may represent the securities in the information technology industry, securities in the semiconductor industry, and securities in the medical appliances industry.

Figure 4:
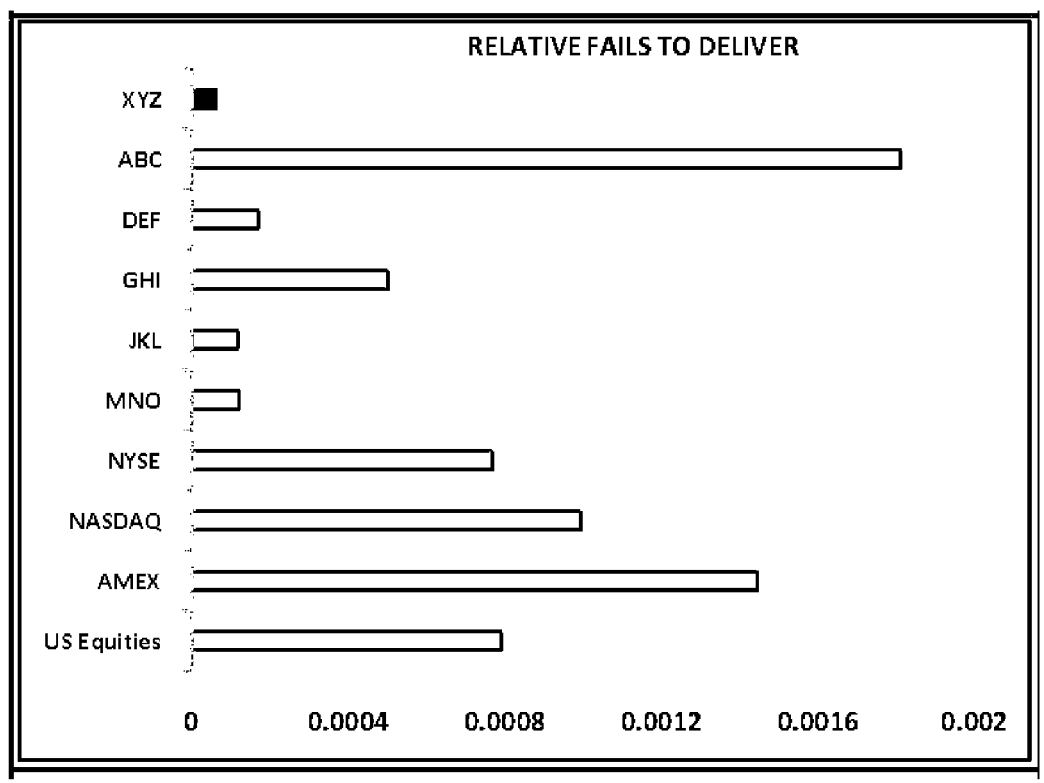
FIG. 4 presents a sample frame of yet another display screen presented by the user interface of the present disclosure.

FIG. 4 presents another sample frame 400 of yet another display screen presented by the user interface 110 of the present disclosure. The frame 400 includes a graph that depicts relative fails to deliver for individual securities, which may be helpful for investors because the graph indicates the level of naked short selling in selected securities. Naked short selling occurs when a short seller does not, or cannot, deliver borrowed securities to the buyer by trade settlement. Naked short selling was made illegal on a temporary basis by Rule 204T in September 2008 and permanently illegal when Rule 204T was rolled into Regulation SHO in July 2009. A high fails-to-deliver ratio indicates increased naked short selling activity and consequently, increased manipulative trading practices by short sellers.

The computer program 106 identifies each fail to deliver instance during a time period for selected securities. For example, the computer program 106 identifies each fail to deliver instance during the last month for the security XYZ. The computer program 106 calculates a short value exposure for each fail to deliver instance for each selected security during the time period by multiplying the volume of shares associated with a fail to deliver instance by a closing price associated with the fail to deliver instance. For example, the computer program 106 multiplies the 1,000 shares of a fail to deliver for the security XYZ by the price of 25 dollars per share for the security to result in a volume of 25,000 dollars for that fail to deliver of the security XYZ. The computer program 106 calculates a summed short value exposure for each selected security by summing the short value exposure for each fail to deliver instance during the time period. For example, the computer program 106 adds the 25,000 dollars of short value exposure that corresponds to a fail to deliver for the security XYZ to 40,000 dollars of short value exposure that corresponds to another fail to deliver for the security XYZ to result in a summed short value exposure of 65,000 dollars for the security XYZ during the last month. The computer program 106 calculates a relative fail to deliver parameter for each selected security by dividing the summed short value exposure by a corresponding market capitalization. For example, the computer program 106 calculates the relative fail to deliver percentage of 0.0001 for the security XYZ by dividing the summed short value exposure of 65,000 dollars by the corresponding market capitalization of 650,000,000 for the security XYZ. The computer program 106 generates a graph by plotting the relative fail to deliver parameter for each selected security on a horizontal axis, and each of the selected securities on a vertical axis. For example, the computer program 106 plots the relative fail to deliver percentage of 0.0001 for the security XYZ in the graph depicted by the frame 400.

The computer program 106 outputs a report that comprises the graph via the user interface 110 to an investor. The investor may infer by a large relative fails to deliver for a security that at least some of the short trading activity in the security is illegal. This illegal short trading activity may create an immediate artificial demand for the security if the short position is bought in by the sellers' broker, as mandated by Regulation SHO. In this scenario, the investor may purchase shares of the security to benefit from the increased demand. For example, the large relative fails to deliver percentage for the security ABC prompts the investor to purchase shares of the security ABC.

Figure 5:
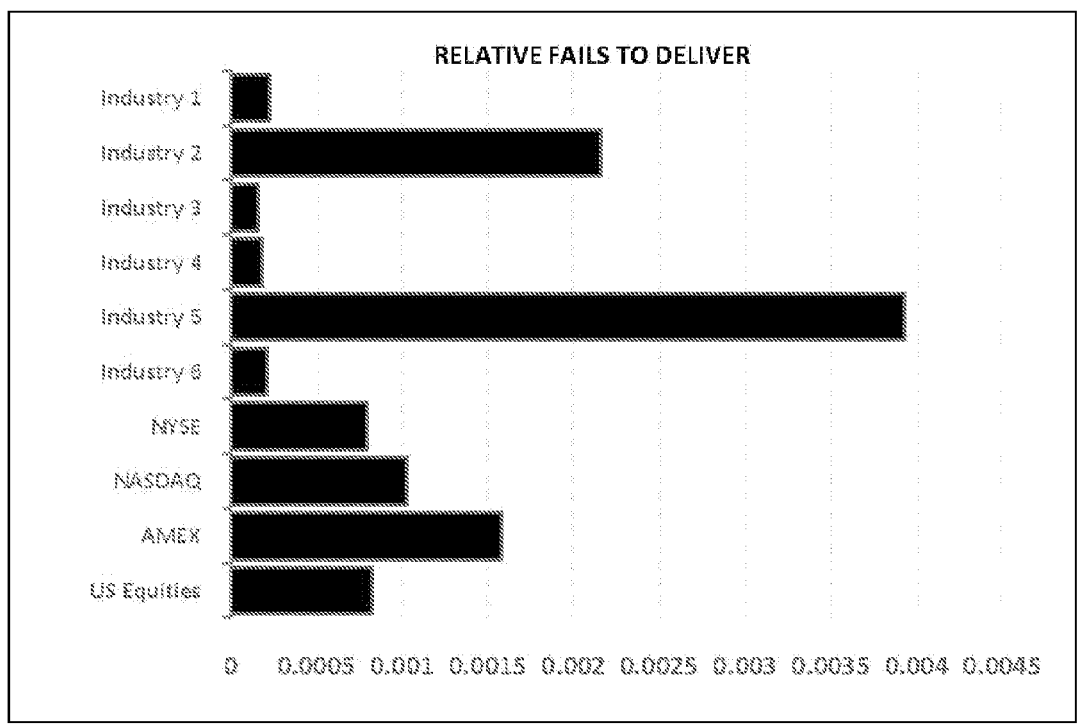
FIG. 5 presents a sample frame of a display screen presented by the user interface of the present disclosure.

FIG. 5 presents a sample frame 500 of a display screen presented by the user interface 110 of the present disclosure. The frame 400 includes a graph that depicts relative fails to deliver for industries, which may be helpful for investors because the graph indicates the level of naked short selling in selected industries. Industries may be selected by the computer program 106 based on common characteristics, such as industries with similar price valuations, or selected by an investor via the user interface 110, such as specific industries that the investor is evaluating. The computations and the graphs that depict relative fails to deliver for industries may be similar to the computations and the graphs that depict relative fails to deliver for securities, as described above in reference to FIG. 4. For example, the large relative fails to deliver percentage for the industry 5 in FIG. 5 prompts the investor to purchase shares of a security JKL in the industry 5.

Figure 6:
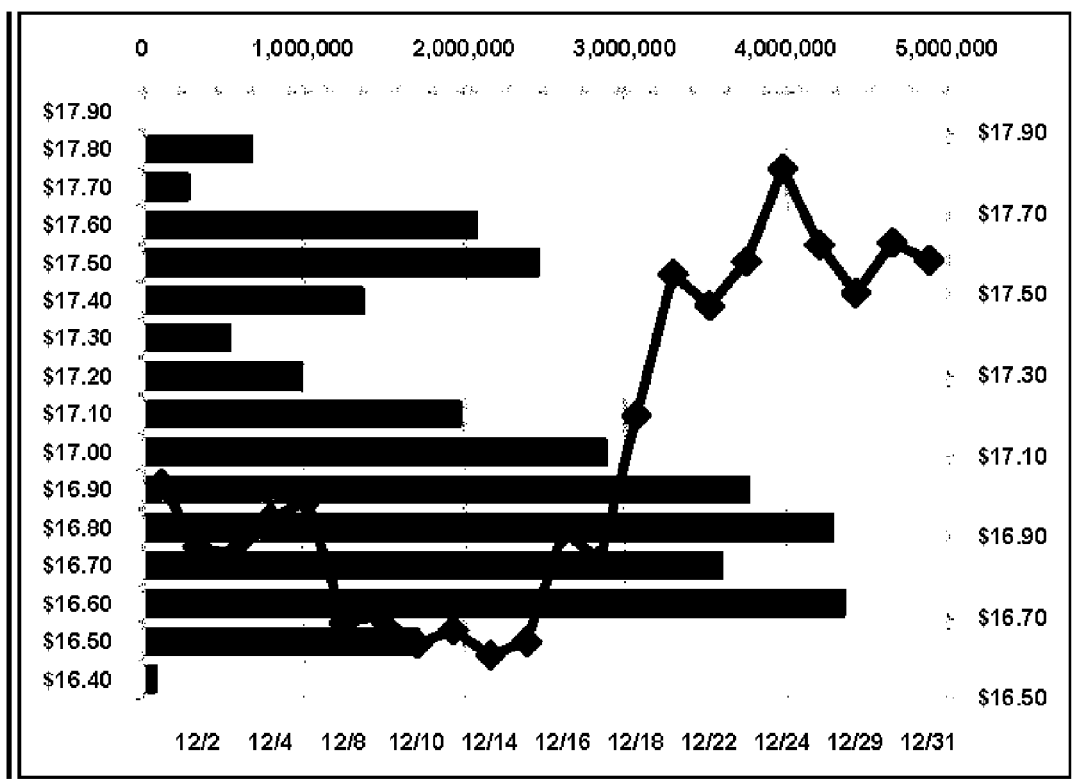
FIG. 6 presents a sample frame of another display screen presented by the user interface of the present disclosure.

FIG. 6 presents another sample frame 600 of another display screen presented by the user interface 110 of the present disclosure. The frame 600 includes a graph depicting short sale volumes based on price and time. The computer program 106 identifies each price point range at which a short sale occurred for a selected security during a time period. For example, the computer program 106 identifies the 16 price point ranges from $16.40 to $17.90 at which short sales occurred for the selected security in December. Each price point range is based on a predetermined price range. For example, the price point range for $17.80 may correspond to short sales that occurred from the price of $17.75 to the price of $17.84. The computer program 106 calculates the short sale volumes of shares for the selected security during the time period by summing the volume of shares associated with each short sale at each price point range. For example, the computer program 106 sums the 500,000 shares traded short at $17.79 with the 300,000 shares traded short at $17.81 to result in 800,000 shares traded short for the $17.80 price range. The computer program 106 generates a graph by plotting the short sale volumes of shares for the selected security on a horizontal axis, plotting each price point range on a vertical access axis, and plotting a short volume weighted average price by time units on a second horizontal axis. For example, the computer program 106 plots the 800,000 shares traded short for the $17.80 price range in the graph depicted by the frame 600 and plots the short volume weighted average price, which ranged from $16.50 to $17.80, for the security on each day in December.

The computer program 106 outputs a report that comprises the graph via the user interface 110 to an investor. The information depicted by the graph in the frame 600 may be helpful to investors because the information may show at what prices and in what quantities short sellers have bet against a security for a given period. An investor may alter his/her trading strategy based upon the current price of the security compared to where and how many times short sellers have bet against the same security. If the majority of the short volume for the period is below the current price, the investor may infer that demand may increase as the security price moves higher and place limit buy orders where they infer strong demand. For example, the price of $17.10 on December $17^{th}$ prompted the investor to purchase shares of the selected security because the majority of the short volume from December $1^{st}$ to December $17^{th}$ was below the price of $17.10. Inversely, if the current price is below the majority of the short volume for the period, the investor may infer an artificially increased amount of supply at a higher price and place limit sell orders immediately below the inferred supply. For example, the price of $16.85 on December $5^{th}$ prompted the investor to sell shares of the selected security because the majority of the short volume from December $1^{st}$ to December $5^{th}$ was above the price of $16.85.

Figure 7:
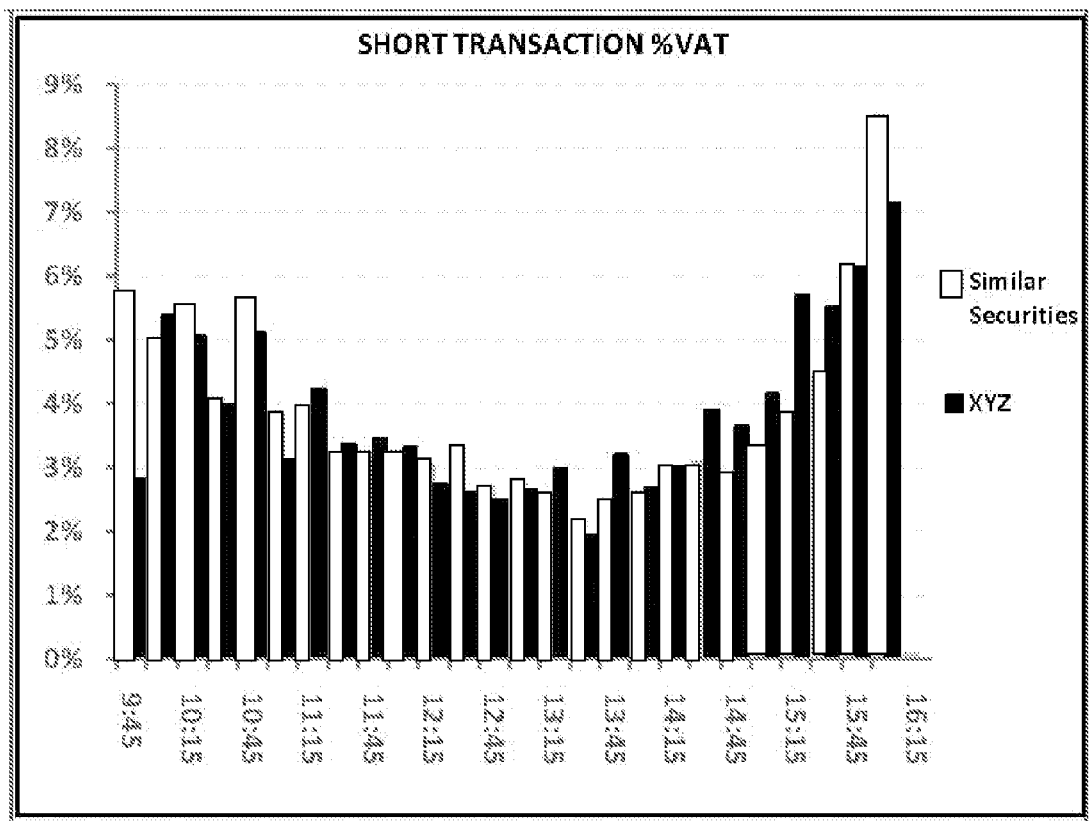
FIG. 7 presents a sample frame of yet another display screen presented by the user interface of the present disclosure.

FIG. 7 presents another sample frame 700 of yet another display screen presented by the user interface 110 of the present disclosure. The frame 700 includes a graph that depicts short sale percentage of volume for a security and similar securities at various times. The computer program 106 calculates short sale volumes of shares for selected securities by summing a volume of shares associated with each short sale for each time unit during a time period. For example, the computer program 106 totals the volume of shares for each short sale in the security XYZ in the telecommunications industry for each half hour interval from 9:30 AM to 4:30 PM. The computer program 106 calculates relative short sale volumes of shares for the selected security by dividing the short sale volumes of shares by the total of the short sale volumes of shares for the selected security. For example, the computer program 106 calculates the 5.8% relative short sale volume of shares traded around 9:45 AM for the security XYZ by dividing the 5,800 short sale volumes of shares traded between 9:30 and 10:00 AM by the total of the 100,000 short sale volumes of shares for the security XYZ traded between 9:30 AM and 4:30 PM.

The computer program 106 identifies similar securities to the security. For example, the computer program 106 identifies other securities in the telecommunication industry as similar to the security XYZ because the security XYZ is in the telecommunications industry. The computer program 106 calculates similar short sale volumes of shares for the similar securities by summing the volume of shares associated with each short sale associated with a similar security for each time unit during the time period. For example, the computer program 106 totals the volume of shares for each short sale in the securities in the telecommunications industry for each half hour interval from 9:30 AM to 4:30 PM. The computer program 106 calculates relative similar short sale volumes of shares for the similar securities by dividing the similar short sale volumes of shares by the total of the similar short sale volumes of shares. For example, the computer program 106 calculates the 2.9% relative short sale volume of shares traded around 9:45 AM for the similar securities by dividing the 29,000 short sale volumes of shares traded between 9:30 and 10:00 AM by the total of the 1,000,000 short sale volumes of shares for the similar securities traded between 9:30 AM and 4:30 PM. The computer program 106 generates a graph by plotting the relative short sale volumes of the shares and the relative similar short sale volumes of shares on a horizontal axis and plotting a relative volume of shares parameter on a vertical axis. For example, the computer program 106 plots the 5.8% relative short sale volume of shares traded around 9:45 AM for the security XYZ and the 2.9% relative short sale volume of shares traded around 9:45 AM for the similar securities on the graph depicted by the frame 700.

The computer program 106 outputs a report that includes the graph via the user interface 110 to an investor. The information in the graph depicted by the frame 700 may be helpful for the investor because the graph indicates when short sellers are active in a security compared to similar securities. If a security has an unusually high percentage of short sales occurring at times when similar securities do not, an investor may infer that a specific short seller is using a specific strategy to initiate a short position. Moreover, if there is an unusually large or small amount of short selling activity at the open or close in a security compared to similar securities, an investor may conclude that the security is being potentially manipulated by short sellers. An investor may wait to purchase shares until the times when short-sellers are historically active to benefit from the increased supply in the marketplace. For example, the investor may purchase shares in the security XYZ at 4:00 PM because short-sellers are historically active both in the security XYZ and in similar telecommunications securities around 4:00 PM. Conversely, an investor may wait until times when short sellers are relatively inactive to sell shares to avoid competition for buyers. For example, the investor may sell shares in the security XYZ at 1:30 PM because short-sellers are historically relatively inactive both in the security XYZ and in similar telecommunications securities around 1:30 PM.

Figure 8:
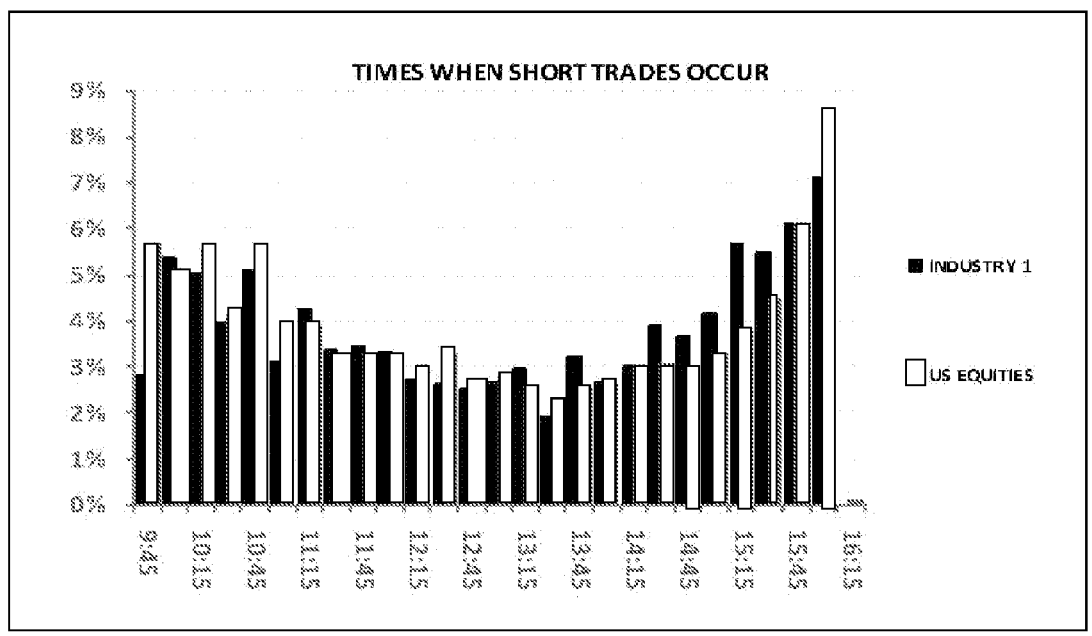
FIG. 8 presents a sample frame of a display screen presented by the user interface of the present disclosure.

FIG. 8 presents a sample frame 800 of a display screen presented by the user interface 110 of the present disclosure. The frame 800 includes a graph that depicts short sale percentage of volume for an industry and other industries at various times. The computations and the graphs that depict short sale percentage of volume for an industry and other industries at various times may be similar to the computations and the graphs that depict short sale percentage of volume for a security and similar securities at various times, as described above in reference to FIG. 7. For example, the investor may purchase shares in the security JKL in the industry 1 at 4:00 PM because short-sellers are historically active both in the industry 1 and in U.S. equities around 4:00 PM.

Figure 9:
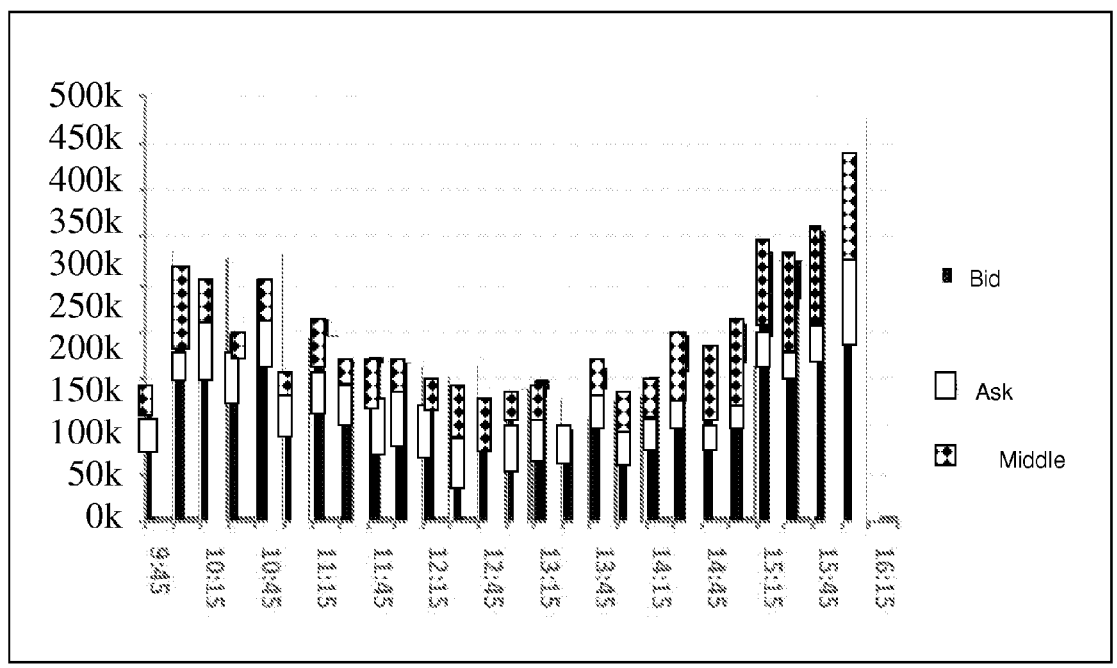
FIG. 9 presents a sample frame of another display screen presented by the user interface of the present disclosure.

FIG. 9 presents another sample frame 900 of another display screen presented by the user interface 110 of the present disclosure. The frame 900 includes a graph that depicts short sale bid-ask middle analysis relative to time. When trading in a stock market, a person who has shares to sell may not wish to sell them at the current market price, or quote, and may wish to sell them at an "ask" price that is higher than the current market price. Likewise, a person who wishes to buy shares may not wish to pay the current market price either and may wish to buy shares at a "bid" price that is lower than the current market value. In such situations, some negotiation may be necessary in order for a trade to occur. The negotiation often comes in the form of adjusting the bid prices and the ask prices as the value of the share goes up and down. For example, if a share is worth $10, a buyer may "bid" $9.97 (3 cents less), and a seller may "ask" for $10.02 (2 cents more). If the value of the stock goes down, a seller may be forced to reduce his asking price. Conversely, if the value of the stock goes up, a buyer may be forced to increase his bidding price. Most of the time, the bid and ask prices remain very close to the market value of the share, often separated by only a few cents. The difference between the bid and ask price is called the bid/ask spread. If a trade occurs at a price that was between the ask price and the bid price, the trade may be said to occur at a "middle" price, whether or not the middle price is exactly at the arithmetic middle between the bid price and the ask price. In actual trading, the parties involved might use a limit order to specify which bid or ask price at which he wishes to trade. The trader specifies the number of shares and his bid/ask price, depending on whether he is buying or selling. Such orders can have execution limits, such as "by end of day" or "all or nothing".

The computer program 106 identifies the volume of shares associated with each short sale for a selected security that occurs at the bid price during a time period; the volume of shares associated with each short sale for the selected security that occurs at the ask price during the time period; and the volume of shares associated with each short sale for the selected security that occurs at a price between the bid price and the ask price during the time period. For example, the computer program 106 identifies that 2,500,000 shares of the selected security traded at the bid price between 9:45 AM and 4:15 PM; 1,500,000 shares of the selected security traded at the ask price between 9:45 AM and 4:15 PM; and 1,00,000 shares of the selected security traded at a middle price between 9:45 AM and 4:15 PM. The computer program 106 calculates the total volume of shares associated with each short sale for the selected security that occurs at the bid price for each time unit during the time period, the total volume of shares associated with each short sale for the selected security that occurs at the ask price for each time unit during the time period, and the total volume of shares associated with each short sale for the selected security that occurs at the price between the bid price and the ask price for each time unit during the time period. For example, the computer program 106 identifies that 180,000 shares of the selected security traded at the bid price between 3:45 and 4:15 PM; 150,000 shares of the selected security traded at the ask price between 3:45 and 4:15 PM; and 110,000 shares of the selected security traded at a middle price between 3:45 and 4:15 PM.

The computer program 106 generates a graph by plotting the total volume of shares associated with each short sale that occurs at the bid price for each time unit during the time period, the total volume of shares associated with each short sale that occurs at the ask price for each time unit during the time period, and the total volume of shares associated with each short sale that occurs at a price between the bid price and the ask price for each time unit during the time period on a horizontal axis and the volume of shares on a vertical axis. For example, the frame 900 depicts that a total of 440,000 shares of the selected security traded between 3:45 and 4:15 PM based on 180,000 shares of the selected security traded at the bid price between 3:45 and 4:15 PM; 150,000 shares of the selected security traded at the ask price between 3:45 and 4:15 PM; and 110,000 shares of the selected security traded at a middle price between 3:45 and 4:15 PM. The frame 900 depicts the volumes for each of the types of trade prices are plotted consecutively, such as the 180,000 shares of the selected security traded at the bid price between 3:45 and 4:15 PM are plotted on the graph from 0 shares to 180,000 shares; the 150,000 shares of the selected security traded at the ask price between 3:45 and 4:15 PM are plotted on the graph from 180,000 shares to 330,0000 shares; and the 110,000 shares of the selected security traded at a middle price between 3:45 and 4:15 PM are plotted on the graph from 330,000 shares to 440,000 shares. However, the frame 900 may depict the volumes for each type of trade prices in a different manner, such as side-by-side, with the plot of each volume type beginning on the graph at 0 shares.

The computer program 106 outputs a report that comprises the graph via the user interface 110 to an investor. The information in the graph depicted by the frame 900 may be helpful to the investor because the graph indicates how many short sales occur at the bid price, the ask price, or a middle price. An investor in a security with a high percentage of short sales occurring on the bid price may infer that short sellers expect the price to fall quickly or wish to push the share price down. Inversely, securities with a high percentage of short sales occurring on the ask price may infer that short sellers wish to prevent the shares from moving higher. An investor may alter their trading strategies accordingly: If a large amount of short sales occur at the bid price, the investor may wish to bid for shares as opposed to purchasing them on the ask price. For example, because the graph depicted by the frame 900 indicates that most of the shares traded between 2:45 PM and 4:15 PM occurred at the bid price, the investor purchases shares at the bid price instead of the ask price at 4:30 PM.

Figure 10:
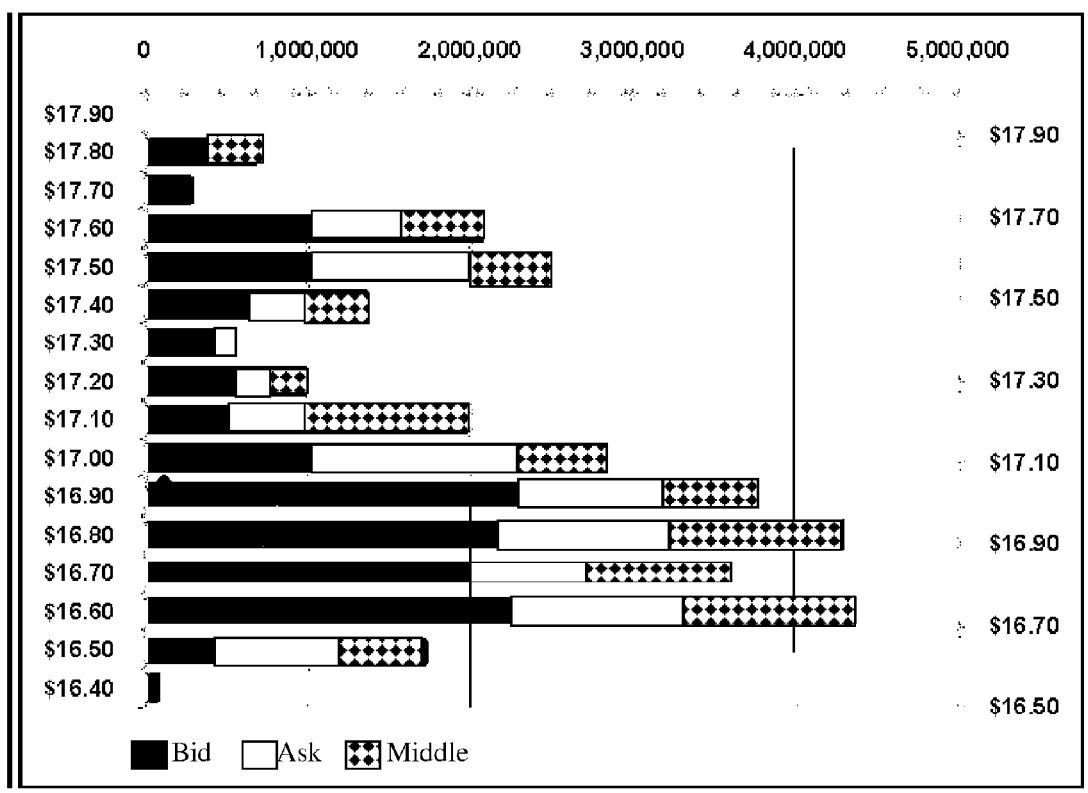
FIG. 10 presents a sample frame of yet another display screen presented by the user interface of the present disclosure.

FIG. 10 presents another sample frame 1000 of yet another display screen presented by the user interface 110 of the present disclosure. The frame 1000 includes a graph that depicts short sale bid-ask middle analysis relative to share price. The computer program 106 identifies the volume of shares associated with each short sale for a selected security that occurs at the bid price during a time period, the volume of shares associated with each short sale for the selected security that occurs at the ask price during the time period, and the volume of shares associated with each short sale for the selected security that occurs at a middle price between the bid price and the ask price during the time period. For example, the computer program 106 identifies that 20,000,000 shares of the selected security were sold short at the bid price; 10,000,000 shares of the selected security were sold short at the ask price; and 10,000,000 shares of the selected security were sold short at a middle price. The computer program 106 identifies each price point range at which a short sale for the selected security occurred during the time period, wherein each price point range is based on a predetermined price range. For example, the computer program 106 identifies 15 price point ranges between the share prices of $16.40 and $17.90 at which a short sale for the selected security occurred during the past month. The computer program 106 calculates, for the security, the total volume of shares associated with each short sale for the selected security that occurs at the bid price for each price point during the time period, the total volume of shares associated with each short sale for the selected security that occurs at the ask price for each price point during the time period, and the total volume of shares associated with each short sale for the selected security that occurs at a middle price between the bid price and the ask price for each price point during the time period. For example, the computer program 106 identifies that 20,000,000 shares of the selected security that were sold short at the bid price between the share prices of $16.40 and $17.90; 10,000,000 shares of the selected security that were sold short at the ask price between the share prices of $16.40 and $17.90; and 10,000,000 shares of the selected security that were sold short at a middle price between the share prices of $16.40 and $17.90.

The computer program 106 generates a graph by plotting the total volume of shares associated with each short sale that occurs at the bid price for each price point during a time period, the total volume of shares associated with each short sale that occurs at the ask price for each price point during the time period, and the total volume of shares associated with each short sale that occurs at a price between the bid price and the ask price for each price point during the time period on a vertical axis and a volume of shares on a horizontal axis. For example, the computer program 106 generates a graph by plotting the graph in the frame 1000 that depicts that a total of 3,800,000 shares of the selected security traded at the share price of approximately $16.90 based on 2,200,000 shares of the selected security traded at the bid price for the share price of approximately $16.90; 1,000,000 shares of the selected security traded at the ask price for the share price of approximately $16.90; and 600,000 shares of the selected security traded at a middle price for the share price of approximately $16.90. The frame 1000 depicts the volumes for each of the types of trade prices are plotted consecutively, such as the 2,200,000 shares of the selected security traded at the bid price for the share price of approximately $16.90 are plotted on the graph from 0 shares to 2,200,000 shares; the 1,000,000 shares of the selected security traded at the ask price for the share price of approximately $16.90 are plotted on the graph from 2,200,000 shares to 3,200,0000 shares; and the 600,000 shares of the selected security traded at a middle price for the share price of approximately $16.90 fare plotted on the graph from 3,200,000 shares to 3,800,000 shares. However, the frame 1000 may depict the volumes for each type of trade prices in a different manner, such as side-by-side, with the plot of each volume type beginning on the graph at 0 shares.

The computer program 106 outputs a report that includes the graph via the user interface 110 to an investor. The information in the graph depicted by the frame 1000 may be helpful to the investor because the graph indicates how many short sales occur at the bid price, the ask price, or a middle price for various ranges of share prices. An investor in a security with a high percentage of short sales occurring at the bid price for lower share prices may infer that short sellers expect the price to fall quickly or wish to push the share price down. Inversely, securities with a high percentage of short sales at the ask price for higher share prices may indicate that short sellers wish to prevent the shares from moving higher. An investor may alter their trading strategies accordingly: If a large amount of short sales occur at the bid price for a certain share price, the investor purchases shares at the bid price for shares as opposed to purchasing them on the ask. For example, because the graph depicted by the frame 1000 indicates that most of the shares that were sold short at the share price of $16.90 occurred at the bid price, the investor purchases shares at the bid price instead of the ask price when the share price is $16.90.

Figure 11:
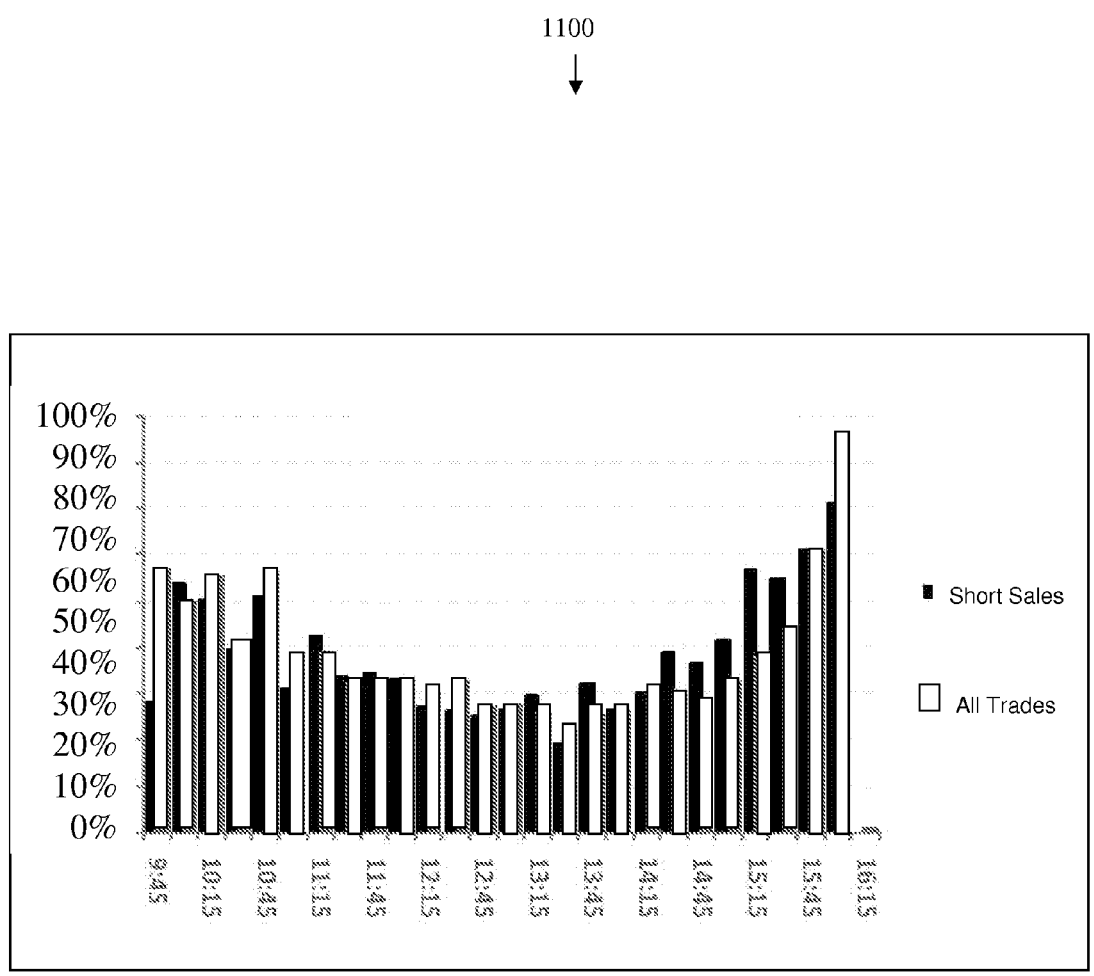
FIG. 11 presents a sample frame of a display screen presented by the user interface of the present disclosure.

FIG. 11 presents a sample frame 1100 of a display screen presented by the user interface 110 of the present disclosure. The frame 1100 includes a graph that depicts short sale bid-ask-middle analysis relative to all trade bid-ask-middle analysis over time. The computer program 106 identifies the volume of shares associated with each trade that occurs at the bid price during a time period, the volume of shares associated with each trade that occurs at the ask price during the time period, and the volume of shares associated with each trade that occurs at a middle price between the bid price and the ask price during the time period. For example, the computer program 106 identifies that 25,000,000 shares of a selected security traded at the bid price between 9:45 AM and 4:15 PM; 15,000,000 shares of the selected security traded at the ask price between 9:45 AM and 4:15 PM; and 10,000,000 shares of the selected security traded at a middle price between 9:45 AM and 4:15 PM. The computer program 106 calculates the total volume of shares associated with each trade that occurs at the bid price for the selected security for each time unit during the time period, the total volume of shares associated with each trade that occurs at the ask price for the selected security for each time unit during the time period, and the total volume of shares associated with each trade that occurs at a middle price between the bid price and the ask price for the selected security for each time unit during the time period. For example, the computer program 106 identifies that 1,800,000 shares of the selected security traded at the bid price between 3:45 and 4:15 PM; 1,500,000 shares of the selected security traded at the ask price between 3:45 and 4:15 PM; and 1,100,000 shares of the selected security traded at a middle price between 3:45 and 4:15 PM.

The computer program 106 calculates a relative volume of shares associated with each trade that occurs at the bid price for each time unit during a time period by dividing the total volume of shares associated with each trade that occurs at the bid price for each time unit during the time period by a sum of the total volume of shares associated with each trade that occurs at the bid price for each time unit during the time period, the total volume of shares associated with each trade that occurs at the ask price for each time unit during the time period, and the total volume of shares associated with each trade that occurs at the price between the bid price and the ask price for each time unit during the time period. For example, the computer program 106 calculates that 95% of the shares of the selected security traded at the bid price between 3:45 PM and 4:15.

The computer program 106 identifies the volume of shares associated with each short sale that occurs at a bid price for the selected security during the time period, the volume of shares associated with each short sale that occurs at the ask price for the selected security during the time period, and the volume of shares associated with each short sale that occurs at a middle price between the bid price and the ask price for the selected security during the time period. For example, the computer program 106 identifies that 2,500,000 shares of the selected security were sold short at the bid price between 9:45 AM and 4:15 PM; 1,500,000 shares of the selected security were sold short at the ask price between 9:45 AM and 4:15 PM; and 1,000,000 shares of the selected security were sold short at a middle price between 9:45 AM and 4:15 PM. The computer program 106 calculates the total volume of shares associated with each short sale that occurs at the bid price for the selected security for each time unit during the time period, the total volume of shares associated with each short sale that occurs at the ask price for the selected security for each time unit during the time period, and the total volume of shares associated with each short sale that occurs at a middle price between the bid price and the ask price for the selected security for each time unit during the time period. For example, the computer program 106 identifies that 180,000 shares of the selected security were sold short at the bid price between 3:45 and 4:15 PM; 150,000 shares of the selected security were sold short at the ask price between 3:45 and 4:15 PM; and 110,000 shares of the selected security were sold short at a middle price between 3:45 and 4:15 PM.

The computer program 106 calculates a relative volume of shares associated with each short sale that occurs at the bid price for each time unit during a time period by dividing the total volume of shares associated with each short sale that occurs at the bid price for each time unit during the time period by a sum of the total volume of shares associated with each short sale that occurs at the bid price for each time unit during the time period, the total volume of shares associated with each short sale that occurs at the ask price for each time unit during the time period, and the total volume of shares associated with each short sale that occurs at the price between the bid price and the ask price for each time unit during the time period. For example, the computer program 106 calculates that 80% of the shares of the selected security short sold at the bid price between 3:45 PM and 4:15.

The computer program 106 generates a graph by plotting the relative volume of shares associated with each trade that occurs at the bid price for each time unit during the time period on a horizontal axis Alternatively, the investor may enter user input via the user interface 110 to select whether the graph depicts relative bid volumes, relative ask volumes, or relative middle volumes. The computer program 106 also plots the corresponding relative volume of shares associated with each short sale that occurs at the bid price for each time unit during the time period on the horizontal axis and a relative volume of shares on a vertical axis. For example, the graph depicted by the frame 1100 indicates that 95% of all trades for the selected security occurred at the bid price and 80% of all short sales for the selected security occurred at the bid price from 3:45 PM to 4:15 PM.

The computer program 106 outputs a report that includes the graph via the user interface 110 to an investor. The information in the graph depicted by the frame 1100 may be helpful to the investor because the graph indicates what percentage of short sales for a security that occurred at the bid price, the ask price, and a middle price compared to total trades for the security that occurred at the bid price, the ask price, and a middle price. An investor in a security with a high percentage of short sales occurring at the bid price may infer that short sellers expect the price to fall quickly or wish to push the share price down. Inversely, securities with a high percentage of short sales at the ask price may indicate that short sellers wish to prevent the shares from moving higher. An investor may alter their trading strategies accordingly: If a large amount of short sales occur at the bid price, the investor may wish to bid for shares as opposed to purchasing them on the ask. For example, the investor purchases shares of the selected security at the bid price at 3:00 PM because the graph depicted in the frame 1100 indicates that 58% of short sales for the selected security occurred at the bid price in contrast to 38% of all trades for the selected security occurred at the bid price.

Figure 12:
FIG. 12 presents a sample frame of another display screen presented by the user interface of the present disclosure.

FIG. 12 presents another sample frame 1200 of another display screen presented by the user interface 110 of the present disclosure. The frame 1200 includes a trend analysis chart based on securities with historically similar parameters. The computer program 106 identifies a closing price for each time unit in a time period, a short to float ratio for each time unit in the time period, and/or a number of cover days for each time unit in the time period; for each of multiple securities. For example, the computer program 106 identifies the closing price, the short to float ratio, and the number of cover days for each day during the past five years for all securities. The computer program 106 inputs user parameter(s) associated with the securities. The user parameter(s) may include a closing price, a short to float ratio, a number of cover days, a percent price movement, a short interest change, an industry, a price valuation, a price to book ratio, a debt ratio, working capital, and/or an enterprise value to earning before interest, taxation, depreciation, and amortization ratio. For example, the computer program 106 receives the user input of a share price of $22.00, a short to float ration of 20%, 15 cover days, and a designation of the automobile industry. The computer program 106 identifies a set of similar securities based on short sale information associated with the set of similar securities that is associated with the user parameter(s). For example, the computer program 106 identifies a set of securities that had a historical share price of within 5% of $22.00, a historical short to float ratio of within 5% of 20%, a historical number of cover days within 5% of 15 cover days, and a categorization within the automobile industry. The computer program 106 calculates historical indicator(s) for the set of similar securities, wherein the historical indicator(s) include a price change, a short to float ratio, and/or a number of cover days. For example, the computer program 106 calculates the price change percentage, the short to float ratio, and the number of cover days for the set of securities corresponding to a time period one month after the data for the set of securities satisfies the requirements based on the user parameter(s) to a time period twenty-four months after the data for the set of securities satisfies the requirements based on the user parameter(s), as indicated in the first four rows of the frame 1200.

The computer program 106 may calculate a projected parameter(s) for the set of similar securities. The projected parameter(s) may include a short target based on the user parameter(s) and the historical indicator(s), and a short interest target based on the user parameter(s) and the historical indicator(s). For example, the computer program 106 calculates a short target of $20.24 based on the user parameter of $22 for the share price and the historical indicator of a negative 8 percent for the price percentage change, as indicated in the sixth row of the frame 1200. In another example, the computer program 106 calculates a short interest target based on the short to float ratio of 22% and a capitalization of 10,000,000 dollars, as indicated in the seventh row of the frame 1200.

The computer program 106 outputs a report that includes the historical indicator(s) and/or the projected parameter(s) via the user interface 110 to an investor. For example, an investor owns security XYZ, which has recently decreased in price by 20% to $10 as the short interest has increased in size 20% to 10%. The investor is considering selling the shares if he believes this trend will continue. The investor enters the price and short interest changes for the security XYZ to request the computer program 106 to run a statistical analysis of every security with similar price and short interest changes over the past five years. The computer program 106 searches for every security that has had a combination of a $10 price, plus or minus 20%, and a 10% short interest increase, plus or minus 20 percent, in the past 5 years. The computer program 106 identifies 769 companies that at some point in time over the past 5 years had a share price between $8 and $12 and a short interest between 8% and 12%. The computer program 106 identifies data that indicates that these 769 companies decreased in value over a period of 3 months by an average 8%. Utilizing this information, the investor decides to sell his shares in the security XYZ.

Figure 13:
FIG. 13 presents a sample frame of yet another display screen presented by the user interface of the present disclosure.

FIG. 13 presents another sample frame 1300 of yet another display screen presented by the user interface 110 of the present disclosure. The frame 1300 includes a chart for securities based on user specified parameters. The computer program 106 inputs a user parameter(s) associated with selected securities. The user parameter(s) may include a change in short interest parameter, a percent change in short interest parameter, a change in short target parameter, a percent change in daily short volume parameter, a change in price parameter, a percent change in price parameter, and/or a time period parameter. For example, because an investor who owns a portfolio of securities does not wish to own securities that have a large increase in short selling, the investor inputs a user parameter of a short interest increase of 20% for his securities. The computer program 106 identifies when any of the short sale information exceeds any limit associated with the user parameter(s) for any of the selected securities. For example, the computer program 106 identifies when the short sale information for the investors' XYZ security exceeds the user-specified short interest increase of 20%. The computer program 106 outputs a report that includes any identified securities and any of the short sale information that exceeds any limit associated with the user parameter(s) via the user interface 110 to an investor. For example, the computer program 106 outputs the report depicted in the frame 1300, which notifies the investor that the securities XYZ and ABC have a short interest % change of 20% or greater. The investor may select the securities XYZ and ABC to verify that there has been some increased short selling activity in the securities XYZ and ABC. Utilizing this information, the investor decides to sell his shares in the securities XYZ and ABC.

FIG. 14 presents a sample frame 1400 of a display screen presented by the user interface 110 of the present disclosure. The frame 1400 includes a chart that lists securities based on user inputs. The computer program 106 calculates a percentage short interest change for securities by subtracting an associated short interest at an end of a time period from an associated short interest at a beginning of the time period to result in a short interest change and dividing the short interest change by the associated short interest at the beginning of the time period. For example, the computer program 106 calculates a negative 30 percentage short interest change for the security ROIA. The computer program 106 calculates a percentage price change for the securities by subtracting an associated price at the end of the time period from an associated price at the beginning of the time period to result in a price change and dividing the price change by the associated price at the beginning of the time period. For example, the computer program 106 calculates a positive 61 percentage price change for the security ROTA.

An investor would like some new ideas concerning potential investments that have active short sellers in them. The investor would specifically like to know which stocks are moving higher as a result of increased demand by short sellers who are covering their short positions. The computer program 106 selects a set of securities based on whether the percentage short interest change is a positive percentage short interest change or a negative percentage short interest change and whether the percentage price change is a positive percentage price change or a negative percentage price change. For example, the computer program 106 selects the security ROIA because the security ROTA has a short interest change of negative 30% and a price change of positive 61%. Selecting the set of securities may be based on whether a system user inputs a request to select securities based on an associated positive percentage short interest change or an associate negative percentage short interest change and an associated positive percentage price change or an associated negative percentage price change. For example, the investor may have input a request for securities with a negative short interest change and a positive price change because the investor is interested in securities with a decrease in short interest and an increase in market capitalization. Each of the selected set of securities may be associated with a short float ratio greater than a minimum short float ratio input by a system user. For example, the investor inputs a minimum short/float ratio of 10%.

The computer program 106 calculates an absolute value change for each of the set of securities by summing an absolute value of an associated percentage short interest change and an absolute value of an associated percentage price change. For example, the computer program 106 calculates a 91% (or 0.91) absolute value change for the security ROTA by summing the absolute value of the short interest change of negative 30% and the absolute value of the price change of positive 61%. The computer program 106 sorts each of the set of securities by a corresponding absolute value change to create a list of sorted securities. For example, the computer program 106 sorts the set of selected securities to create the list depicted by the chart of the frame 1400.

The computer program 106 outputs a report that includes the list of sorted securities via the user interface 110 to an investor. For example, the computer program 106 outputs the chart of the frame 1400. In response, the investor selects the security ROTA because the chart of the frame 1400 indicates that the short interest has decreased 30% and the market capitalization has increased 61%. The investor believes that the share prices of the security ROIA will continue to increase based on the current situation the short sellers are facing, being short of the stock at a much lower price, and purchases shares in the security ROTA.

FIG. 15 presents another sample frame 1500 of another display screen presented by the user interface 110 of the present disclosure. The frame 1500 is similar to the frame 1400 depicted in FIG. 14, except that the computer program 106 has selected and sorted the set of selected securities to create the list based on a positive change in short interest and a negative change in price. The information in the frame 1500 may be helpful for the investor because the frame 1500 indicates which securities are being sold by short sellers as the price decreases.

FIG. 16 presents another sample frame 1600 of yet another display screen presented by the user interface 110 of the present disclosure. The frame 1600 is similar to the frame 1400 depicted in FIG. 14, except that the computer program 106 has selected and sorted the set of selected securities to create the list based on a negative change in short interest and a negative change in price. The information in the frame 1600 may be helpful for the investor because the frame 1600 indicates which securities are being repurchased by short sellers as the price decreases.

FIG. 17 presents a sample frame 1700 of a display screen presented by the user interface 110 of the present disclosure. The frame 1700 is similar to the frame 1400 depicted in FIG. 14, except that the computer program 106 has selected and sorted the set of selected securities to create the list based on a positive change in short interest and a positive change in price. The information in the frame 1700 may be helpful for the investor because the frame 1700 indicates which securities are being sold by short sellers as the price increases.

Each of the securities discussed in reference to FIG. 14 to FIG. 17 may include an industry group of securities. An investor may be interested in comparing the short selling activity in different industries as part of his research. The investor specifically would like to know which industries to avoid due to short selling activity. The computer program 106 may generate a chart that indicates which industries have the highest combination of an increase in combined short dollar exposure and a decrease in combined market capitalization. The investor may infer that many of the stocks in such an industry have large monetary bets being placed against them and decide not to invest in any securities of the industry group until the situation changes.

Because the frames 200-1700 are samples, the frames 200-1700 could vary greatly in appearance. For example, the relative sizes and positioning of the axes and the data is not important to the practice of the present disclosure. The frames 200-1700 can be depicted by any visual display, but are preferably depicted by a computer screen. The frames 200-1700 can be part of a personal computer system and/or a network, and operated from data received locally, by the network, and/or on the Internet. The frames 200-1700 may be navigable by a user. Typically, the user can employ a mouse input device to point-and-click to a location on the frames 200-1700 to manage the data on the frames 200-1700, such as selecting a frame or a symbol for a security to receive more information about the security. Alternately, the user can employ directional indicators, or other input devices such as a keyboard. The data depicted by the frames 200-1700 are examples, as the frames 200-1700 may have a much larger number of securities, industries, times, price points, parameters, and price valuations. Note that although the text and data as shown is located in some parts of the frames 200-1700, in another embodiment the text and data could be located in other parts of the frames 200-1700.

Figure 18:
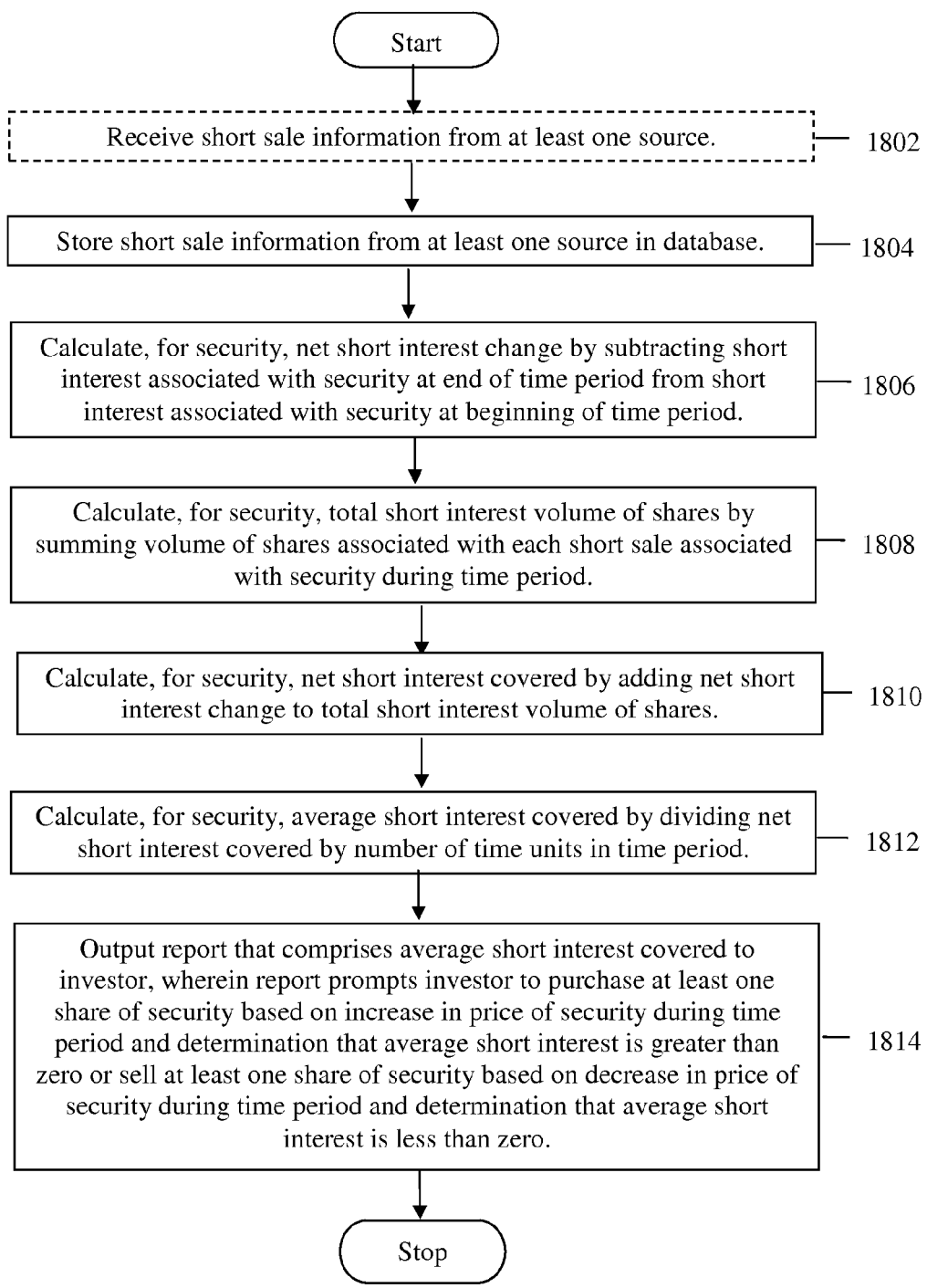
FIG. 18 presents a sample method of the present disclosure.

FIG. 18 presents a sample method 1800 of the present disclosure. The system 100 may execute the method 1800 to generate reports of short sale information.

In box 1802, short sale information is optionally received from at least one source. For example, the computer program 106 receives the short sale information 116 from the trade information source 112.

In box 1804, short sale information from at least one source is stored in a database. For example, the computer program 106 stores the short sale information 116 in the database 114.

In box 1806, a net short interest change for a security is calculated by subtracting a short interest associated with the security at an end of a time period from a short interest associated with the security at a beginning of the time period. For example, the computer program 106 calculates a net short interest change of negative 1,265,172 by subtracting 33,337,158, the short interest associated with the security at the end of December, from 32,071,986, the short interest associated with the security at the beginning of December.

In box 1808, a total short interest volume of shares is calculated for a security by summing the volume of shares associated with each short sale associated with the security during time period. For example, the computer program 106 calculates a total short interest volume of 31,018,762 shares by summing the volume of shares associated with each short sale associated with the security during December.

In box 1810, a net short interest covered is calculated for the security by adding a net short interest change to a total short interest volume of shares. For example, the computer program 106 calculates a net short interest covered of 29,753, 590 by adding negative 1,265,172, the net short interest change, to 31,018,762, the total short interest volume of shares.

In box 1812, an average short interest covered is calculated for the security by dividing a net short interest covered by a number of time units in a time period. For example, the computer program 106 calculates an average short interest covered of 1,416,838 by dividing 29,753,590, the net short interest covered, by 21 trading days in December.

In box 1814, a report that includes the average short interest covered is output to an investor, wherein the report prompts the investor to purchase at least one share of security based on an increase in the price of a security during a time period and a determination that the average short interest is greater than zero or sell at least one share of the security based on a decrease in the price of the security during the time period and a determination that the average short interest is less than zero. For example, the computer program 106 outputs a report that includes the average short interest covered of 1,416,838 to an investor. The information in this report may be helpful to the investor because the information indicates how many short sellers are repurchasing the security. A large average daily cover volume can also indicate future demand for the security. If the price of the security has been moving higher for the past month accompanied by a large increase in average short cover volume, an investor may infer future demand for the security based on the current short interest and purchase shares of the security. Conversely, if the price of the security has been moving lower for the past month accompanied by a large decrease in short cover volume, an investor may infer that short sellers believe that the shares will fall further, and sell shares in the security.

Accordingly, a system, computer program product, and method are provided for aggregating, analyzing, and distributing short sale information 116. The system 100 aggregates and analyzes the short-sale trade information 116, then formats and outputs the analyzed information in reports 118 that are helpful to investors for making investment decisions.

The systems, methods, and computer program products in the embodiments described above are exemplary. Therefore, many details are neither shown nor described. Even though numerous characteristics of the embodiments of the present disclosure have been set forth in the foregoing description, together with details of the structure and function of the present disclosure, the present disclosure is illustrative, such that changes may be made in the detail, especially in matters of shape, size and arrangement of the components within the principles of the present disclosure to the full extent indicated by the broad general meaning of the terms used in the attached claims. The description and drawings of the specific examples above do not point out what an infringement of this patent would be, but are to provide at least one explanation of how to make and use the present disclosure. The limits of the embodiments of the present disclosure and the bounds of the patent protection are measured by and defined in the following claims.

The invention claimed is:

1. A system for short trade information the system comprising:
    a computer;
    a memory associated with the computer;
    a user interface associated with the computer; and
    a computer program stored in the memory and executed by the computer to:
    store short trade information from at least one source in a database, wherein the short trade information is associated with a security;
    identify, for the security, a plurality of price point ranges at which a short trade occurred during a time period, wherein each price point range of the plurality of price point ranges is based on a predetermined price range;
    calculate, for the security, a plurality of short trade volumes of shares during the time period by aggregating a volume of shares associated with each short trade at each price point range;
    generate, for the security, a graph by plotting the plurality of short trade volumes of shares on a horizontal axis, plotting each price point range on a vertical access axis, and plotting a short volume weighted average price by time units on a second horizontal axis; and
    output a report that comprises the graph via the user interface to an investor, wherein the report prompts the investor to one of purchase at least one share of the security based on the graph depicting a current short volume weighted average price for the security above a majority of the short trade volume of shares during the time period and sell at least one share of the security based on the graph depicting the current short volume weighted average price for the security below the majority of the short trade volume of shares during the time period.

2. A system for short trade information the system comprising:
    a computer;
    a memory associated with the computer;
    a user interface associated with the computer; and
    a computer program stored in the memory and executed by the computer to:
    store short trade information from at least one source in a database, wherein the short trade information is associated with a security;
    identify, for the security; a volume of shares associated with each short trade that occurs at a bid price during a time period, a volume of shares associated with each short trade that occurs at an ask price during the time period, and a volume of shares associated with each short trade that occurs at a price between the bid price and the ask price during the time period;
    calculate, for the security, a total volume of shares associated with each short trade that occurs at the bid price for each time unit during the time period, a total volume of shares associated with each short trade that occurs at the ask price for each time unit during the time period, and a total volume of shares associated with each short trade that occurs at the price between the bid price and the ask price for each time unit during the time period;
    generate a graph by plotting the total volume of shares associated with each short trade that occurs at the bid price for each time unit during a time period, the total volume of shares associated with each short trade that occurs at the ask price for each time unit during the time period, and the total volume of shares associated with each short trade that occurs at the price between the bid price and the ask price for each time unit during the time period on a horizontal axis and a volume of short trade shares on a vertical axis; and
    output a report that comprises the graph via the user interface to an investor, wherein the report prompts the investor to purchase of at least one share of the security at the bid price based on the graph depicting a trend during recent time units which indicates that a percentage of the total volume of shares associated with each short trade that occurs at the bid price during recent time units relative to an aggregation of the total volume of shares associated with each short trade that occurs at the bid price during recent time units, the total volume of shares associated with each short trade that occurs at the ask price during recent time units, and the total volume of shares associated with each short trade that occurs at the price between the bid price and the ask price during recent time units is increasing.

3. A system for short trade information the system comprising:
- a computer;
- a memory associated with the computer;
- a user interface associated with the computer; and
- a computer program stored in the memory and executed by the computer to:
  - store short trade information from at least one source in a database, wherein the short trade information is associated with a security;
  - identify, for the security; a volume of shares associated with each short trade that occurs at a bid price during a time period, a volume of shares associated with each short trade that occurs at an ask price during the time period, and a volume of shares associated with each short trade that occurs at a price between the bid price and the ask price during the time period;
  - identify, for the security, a plurality of price point ranges at which a short trade occurred during the time period, wherein each price point range of the plurality of price point ranges is based on a predetermined price range
  - calculate, for the security, a total volume of shares associated with each short trade that occurs at the bid price for each price point during the time period, a total volume of shares associated with each short trade that occurs at the ask price for each price point during the time period, and a total volume of shares associated with each short trade that occurs at the price between the bid price and the ask price for each price point during the time period;
  - generate a graph by plotting the total volume of shares associated with each short trade that occurs at the bid price for each price point during a time period, the total volume of shares associated with each short trade that occurs at the ask price for each price point during the time period, and the total volume of shares associated with each short trade that occurs at the price between the bid price and the ask price for each price point during the time period on a vertical axis and a volume of short trade shares on a horizontal axis; and
  - output a report that comprises the graph via the user interface to an investor, wherein the report prompts the investor to purchase of at least one share of the security at the bid price associated with a specific price point based on the graph depicting that a percentage of the total volume of shares associated with each short trade that occurs at the bid price associated with the specific price point during the time period relative to an aggregation of the total volume of shares associated with each short trade that occurs at the bid price associated with the specific price point during the time period, the total volume of shares associated with each short trade that occurs at the ask price associated with the specific price point during the time period, and the total volume of shares associated with each short trade that occurs at the price between the bid price and the ask price associated with the specific price point during the time period.

4. A system for short trade information the system comprising:
- a computer;
- a memory associated with the computer;
- a user interface associated with the computer; and
- a computer program stored in the memory and executed by the computer to:
  - store trade information from at least one source in a database, wherein the trade information is associated with a security;
  - identify, for the security; a volume of shares associated with each trade that occurs at a bid price during a time period, a volume of shares associated with each trade that occurs at an ask price during the time period, and a volume of shares associated with each trade that occurs at a price between the bid price and the ask price during the time period;
  - calculate, for the security, a total volume of shares associated with each trade that occurs at the bid price for each time unit during the time period, a total volume of shares associated with each trade that occurs at the ask price for each time unit during the time period, and a total volume of shares associated with each trade that occurs at the price between the bid price and the ask price for each time unit during the time period;
  - identify, for the security; a volume of shares associated with each short trade that occurs at a bid price during a time period, a volume of shares associated with each short trade that occurs at an ask price during the time period, and a volume of shares associated with each short trade that occurs at a price between the bid price and the ask price during the time period;
  - calculate, for the security, a total volume of shares associated with each short trade that occurs at the bid price for each time unit during the time period, a total volume of shares associated with each short trade that occurs at the ask price for each time unit during the time period, and a total volume of shares associated with each short trade that occurs at the price between the bid price and the ask price for each time unit during the time period;
  - generate a graph by plotting one of the total volume of shares associated with each trade that occurs at the bid price for each time unit during a time period, the total volume of shares associated with each trade that occurs at the ask price for each time unit during the time period, and the total volume of shares associated with each trade that occurs at the price between the bid price and the ask price for each time unit during the time period, and a corresponding one of the total volume of shares associated with each short trade that occurs at the bid price for each time unit during a time period, the total volume of shares associated with each short trade that occurs at the ask price for each time unit during the time period, and the total volume of shares associated with each short trade that occurs at the price between the bid price and the ask price for each time unit during the time period on a horizontal axis and a corresponding percentage of volume of shares on a vertical axis; and
  - output a report that comprises the graph via the user interface to an investor, wherein the report prompts the investor to purchase of at least one share of the security at the bid price based on the graph depicting a trend during recent time units which indicates that a percentage of the total volume of shares associated with each short trade that occurs at the bid price during recent time units relative to an aggregation of the total volume of shares associated with each short trade that occurs at the bid price during recent time units, the total volume of shares associated with each short trade that occurs at the ask price during recent time units, and the total volume of shares associated with each short trade that occurs at the price between the bid price and the ask price during recent time units is increasing relative to a percentage of the total volume of shares associated with each trade that occurs at the bid price during recent time units relative to an aggregation of the total volume of shares associated with each trade that occurs at the bid price during recent time units, the total volume of shares associated with each trade that occurs at the ask price during recent time units, and the total volume of shares associated with each trade that occurs at the price between the bid price and the ask price during recent time units.

* * * * *